(12) United States Patent  
Futai

(10) Patent No.: US 9,897,501 B2  
(45) Date of Patent: Feb. 20, 2018

(54) FLANGE FASTENING SKILL DETERMINATION APPARATUS AND FLANGE FASTENING SKILL DETERMINATION PROGRAM

(71) Applicant: DAICEL CORPORATION, Osaka-shi, Osaka (JP)

(72) Inventor: Masanori Futai, Himeji (JP)

(73) Assignee: DAICEL CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 15/312,357

(22) PCT Filed: Apr. 16, 2015

(86) PCT No.: PCT/JP2015/002105  
§ 371 (c)(1),  
(2) Date: Nov. 18, 2016

(87) PCT Pub. No.: WO2015/177965  
PCT Pub. Date: Nov. 26, 2015

(65) Prior Publication Data  
US 2017/0082510 A1    Mar. 23, 2017

(30) Foreign Application Priority Data  
May 20, 2014    (JP) ................................ 2014-104474

(51) Int. Cl.  
*G01L 5/00* (2006.01)  
*B25B 23/14* (2006.01)  
(Continued)

(52) U.S. Cl.  
CPC ............ *G01L 5/0071* (2013.01); *B25B 23/14* (2013.01); *G01L 5/0033* (2013.01); *G01L 5/24* (2013.01); *G09B 19/24* (2013.01)

(58) Field of Classification Search  
CPC ......... B25B 23/14; G01L 5/0071; G01L 5/24; G01L 5/0033; G09B 19/24  
See application file for complete search history.

(56) References Cited

U.S. PATENT DOCUMENTS 4,829,650 A * 5/1989 Galard ................. B23P 19/067  
29/240  
5,278,775 A    1/1994 Bibel  
(Continued)

FOREIGN PATENT DOCUMENTS

JP    H11101700 A    4/1990  
JP    H02212077 A    8/1990  
(Continued)

OTHER PUBLICATIONS

ISA Japan Patent Office, International Search Report Issued in Application No. PCT/JP2015/002105, dated Jun. 30, 2015, WIPO, 4 pages.  
(Continued)

Primary Examiner — Mischita Henson  
(74) Attorney, Agent, or Firm — Alleman Hall Creasman & Tuttle LLP

(57) ABSTRACT

A flange fastening skill determination apparatus includes: a receiver configured to receive output signals from respective tightening force detectors when a testee tightens a plurality of bolts for connecting flanges together, the tightening force detectors corresponding to the plurality of respective bolts; a measurer configured to obtain measurement results indicating transition of change in each of the output signals from a start to an end of tightening a corresponding bolt; a calculator configured to obtain a first calculation result indicating variation among output signal values during the tightening, a second calculation result indicating variation among output signal values at a time of completion of the tightening, and a third calculation result indicating a degree (Continued)

of tightening force of each of the plurality of bolts at the time of completion; and a determiner configured to determine a skill level of the testee based on the results.

9 Claims, 8 Drawing Sheets

(51) Int. Cl.
  *G01L 5/24* (2006.01)
  *G09B 19/24* (2006.01)

(56) References Cited

U.S. PATENT DOCUMENTS

2011/0184666 A1* 7/2011 Imai .......................... G01L 5/24
                                                                702/43
2013/0047408 A1   2/2013 Kibblewhite

FOREIGN PATENT DOCUMENTS

| JP | H09329281 A | 12/1997 |
| JP | H1194662 A | 4/1999 |
| JP | 4699935 B2 | 6/2011 |

OTHER PUBLICATIONS

ISA Japan Patent Office, Written Opinion of the International Searching Authority Issued in Application No. PCT/JP2015/002105, dated Jun. 30, 2015, WIPO, 4 pages.

* cited by examiner

FLANGE FASTENING SKILL DETERMINATION APPARATUS AND FLANGE FASTENING SKILL DETERMINATION PROGRAM

TECHNICAL FIELD

The present invention relates to a flange fastening skill determination apparatus and a flange fastening skill determination program.

BACKGROUND ART

At a work site of a production facility, for example, a pair of pipes is arranged such that their flanges are butted together with a gasket interposed in between, and the pipes in such a state are connected together by tightening a plurality of bolts of the flanges. Usually, such work of fastening the flanges together by bolts is manually performed by a worker.

In order to keep stable connection between the pipes and prevent leakage from the pipes (flange leakage) for a long term, it is important to properly tighten the bolts at the flanges of the pair of pipes and check the tightened state of each bolt at the time of, for example, maintenance and periodic turnaround. In this respect, for example, Patent Literatures 1 and 2 disclose configurations in which a gasket disposed between a pair of flanges is provided with electrodes and pressure sensors, and thereby the tightened state of each of bolts fastening the flanges is monitored.

CITATION LIST

Patent Literature

PTL 1: Japanese Patent Publication No. 4699935
PTL 2: Japanese Laid-Open Patent Application Publication No. H09-329281

SUMMARY OF INVENTION

Technical Problem

If the tightened state of the bolts fastening the flanges of the pair of pipes is poor, leakage at the flanges after undergoing merely several heat cycles may occur and this poses a problem on the continuation of equipment or plant operation. In the case of turnaround of a petrochemical plant, the number of pipe flanges fastened by bolts may be up to one thousand and several hundred flanges, and it is difficult to check the tightened state of the bolts for each pipe flange. Therefore, for the purpose of preventing defective fastening of the flanges and obtaining a proper fastened state of the flanges, if the skill of workers in flange fastening can be determined in advance before the work of tightening the bolts of the flanges, then it is helpful to assign the workers suitable for the work properly in order to achieve the high work quality. In this respect, the aforementioned Patent Literatures 1 and 2 merely disclose monitoring the tightened state of each bolt after the flanges are fastened and measuring the tightening force of each bolt after the flanges are fastened. Thus, Patent Literatures 1 and 2 are not intended to determine the skill of a worker in bolt tightening in advance.

The present invention has been made in view of the above problems in conventional technology. An objective of the present invention is to provide a flange fastening skill determination apparatus and a flange fastening skill determination program that are capable of objectively and clearly determining the skill of a worker in flange fastening.

Solution to Problem

In order to solve the above-described problems, a flange fastening skill determination apparatus according to one aspect of the present invention includes: a receiver configured to receive output signals that are outputted from respective tightening force detectors when a testee performs work of tightening a plurality of bolts that are tightened for connecting flanges together, the tightening force detectors being individually provided corresponding to the plurality of respective bolts; a measurer configured to obtain a plurality of measurement results, the measurement results indicating transition of change in each of the output signals received by the receiver from a start to an end of the work of tightening a corresponding one of the plurality of bolts; a calculator configured to obtain a first calculation result, a second calculation result, and a third calculation result, each as a skill determining item, by performing calculation on the plurality of measurement results, the first calculation result indicating variation among output signal values of the respective tightening force detectors during the work of tightening the plurality of bolts, the second calculation result indicating variation among output signal values of the respective tightening force detectors at a time of completion of the work of tightening the plurality of bolts, the third calculation result indicating a degree of tightening force of each of the plurality of bolts at the time of completion of the work of tightening the plurality of bolts; a determiner configured to determine, based on results of comparing the skill determining items with determination criteria, to which one of three or more skill levels a skill of the testee in the work of tightening the bolts corresponds; and an output device configured to output a result of the determination performed by the determiner.

A flange fastening skill determination program according to another aspect of the present invention causes a computer to perform: a calculating step of receiving output signals that are outputted from respective tightening force detectors when a testee performs work of tightening a plurality of bolts that are tightened for connecting flanges together, the tightening force detectors being individually provided corresponding to the plurality of respective bolts, obtaining a plurality of measurement results, the measurement results indicating transition of change in each of the received output signals from a start to an end of the work of tightening a corresponding one of the plurality of bolts, and obtaining a first calculation result, a second calculation result, and a third calculation result, each as a skill determining item, by performing calculation on the plurality of measurement results, the first calculation result indicating variation among output signal values of the respective tightening force detectors during the work of tightening the plurality of bolts, the second calculation result indicating variation among output signal values of the respective tightening force detectors at a time of completion of the work of tightening the plurality of bolts, the third calculation result indicating a degree of tightening force of each of the plurality of bolts at the time of completion of the work of tightening the plurality of bolts; a determining step of determining, based on results of comparing the skill determining items with determination criteria, to which one of three or more skill levels a skill of the testee in the work of tightening the bolts corresponds;

and an outputting step of outputting a result of the determination performed in the determining step.

Advantageous Effects of Invention

The flange fastening skill determination apparatus and the flange fastening skill determination program according to the above aspects of the present invention obtain the measurement results indicating the transition of change in the output signal of each of the tightening force detectors from the start to the end of the work of tightening a corresponding one of the bolts that are tightened for fastening the flanges together, and also, obtain the predetermined calculation results by performing calculation on the plurality of measurement results. Accordingly, the calculation results indicate transition of temporal change in the tightening force of each bolt during the bolt tightening work.

By using the first calculation result, which indicates the variation among the output signal values of the respective tightening force detectors during the work of tightening the plurality of bolts, as a skill determining item, it can be evaluated whether or not there is a risk of causing the problem of, for example, flange rotation (i.e., a failure occurring when the gasket load concentrates locally), which could occur due to defective bolt tightening.

Further, by using the second calculation result, which indicates the variation among the output signal values of the respective tightening force detectors at the time of completion of the work of tightening the plurality of bolts, as a skill determining item, it can be evaluated whether or not there is a risk of causing the problem of uneven bolt tightening.

Still further, by using the third calculation result, which indicates the degree of tightening force of each of the plurality of bolts at the time of completion of the work of tightening the plurality of bolts, as a skill determining item, it can be evaluated whether or not the testee is capable of tightening the bolts with proper tightening force.

Determination that in which skill level from one of the three or more skill levels the testee falls in the bolt tightening work by using the above skill determining items makes it possible to evaluate the bolt tightening work itself, which has been difficult with conventional art. Therefore, in addition to the evaluation as to whether or not the tightening force of each bolt after bolt tightening work has been completed is proper, the skill of the testee in the bolt tightening work can be objectively and clearly evaluated regardless of experiences and intuition of the testee. This makes it possible to properly choose the most suitable worker for the bolt tightening work.

Based on the results of comparing the skill determining items with the determination criteria, it is determined to which one of the three or more skill levels the skill of the testee in the bolt tightening work corresponds, and then the determination result is outputted. This makes it possible not only to evaluate whether or not the skill of the testee in the bolt tightening work satisfies the predetermined determination criteria, but also to quickly and clearly determine the specific skill level of the testee in the bolt tightening work.

Thus, the above aspects of the present invention make it possible to provide a flange fastening skill determination apparatus and a flange fastening skill determination program that are capable of objectively and clearly determining the skill of a worker in flange fastening.

DESCRIPTION OF EMBODIMENTS

Hereinafter, embodiments of the present invention are described with reference to the drawings.

Embodiment 1

[Configuration of Flange Fastening Skill Determination Apparatus 1]

Figure 1:
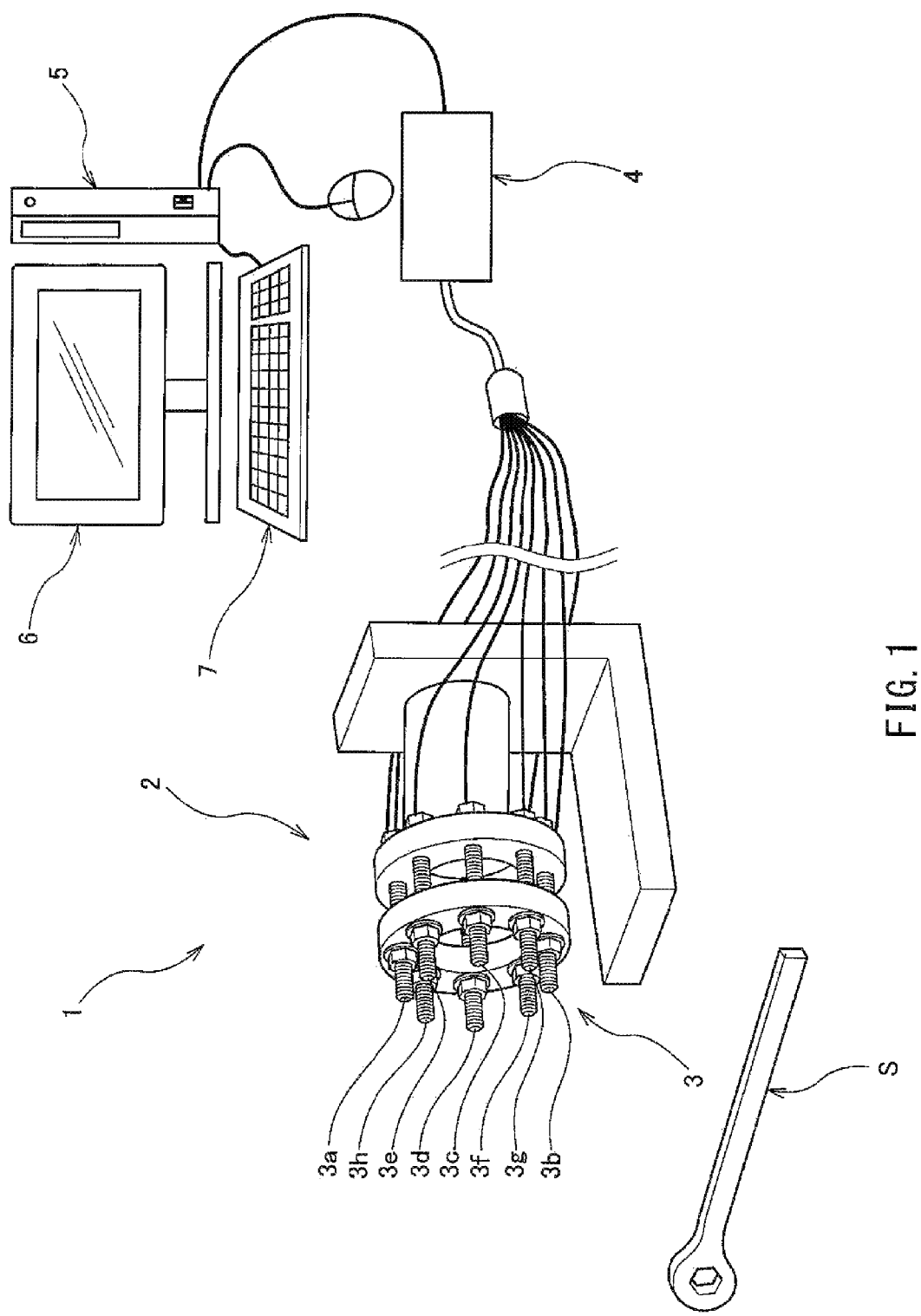
FIG. 1 is a schematic diagram showing the configuration of a flange bolt fastening skill determination apparatus according to Embodiment 1.
Figure 2:
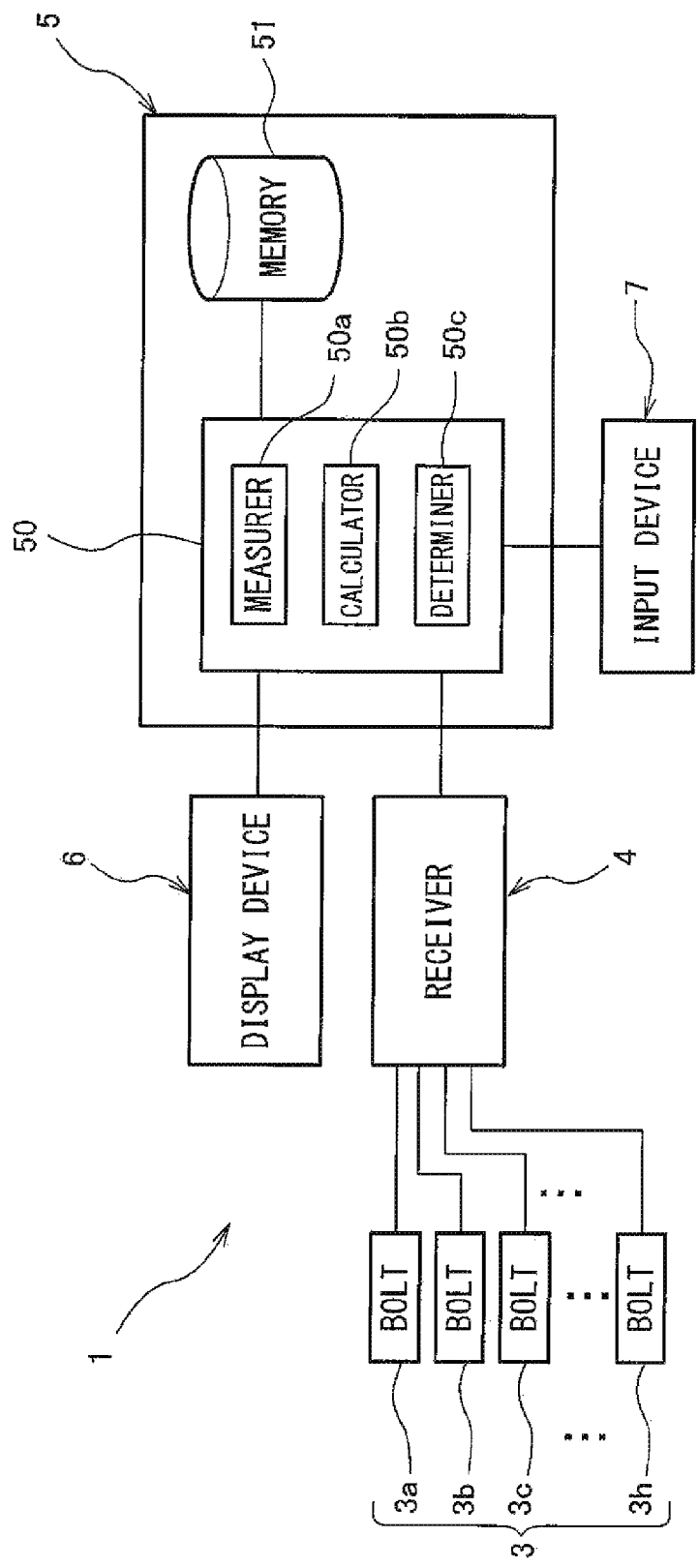
FIG. 2 is a functional block diagram showing the configuration of the flange fastening skill determination apparatus.

FIG. 1 and FIG. 2 show a flange fastening skill determination apparatus 1 (hereinafter, simply referred to as a "determination apparatus 1") according to Embodiment 1. The determination apparatus 1 includes: a dummy flange 2; a plurality of tightening-force-detector-equipped bolts 3 (hereinafter, referred to as "bolts 3 (bolt 3 individually)") mounted on the dummy flange 2; a receiver 4, to which wires extending from the bolts 3 are connected; a personal computer 5 (hereinafter, referred to as a "PC 5") connected to the receiver 4; and a display device 6 and an input device 7, which are connected to the PC 5.

The dummy flange 2 has a shape and structure that imitate an end portion of an actual pipe. As one example, the dummy flange 2 herein includes a pair of annular flanges. Each annular flange has a constant flange face width, and a plurality of (as one example, eight) insertion holes are formed in each flange face, such that the insertion holes are arranged in a circumferential direction at regular intervals. The flanges are arranged such that they face each other with a gasket (not shown) interposed in between.

A tightening force detector (not shown) is embedded in the shank of each bolt 3. As one example, the tightening force detector is configured by using a known temperature-compensated three-wire strain gauge. When the strain gauge is in an energized state, the strain gauge outputs its electrical resistance value as an output signal. When the strain gauge is strained due to tightening of the bolt 3, the electrical resistance of the strain gauge changes, and thereby the output signal of the strain gauge changes. In the determination apparatus 1, the plurality of bolts 3 (as one example, eight bolts 3a to 3h) are used. The bolts 3 are inserted through the insertion holes formed in the flanges of the dummy flange 2. As flange fastening work for a flange fastening skill determination test, a worker taking the determination test, i.e., a testee, screws a nut onto each bolt 3, and tightens each set of bolt 3 and nut with a spanner S. As a result, the annular flanges of the dummy flange 2 are fastened together with the gasket interposed in between. In the description below, tightening a set of bolt 3 and nut is simply referred to as "tightening a bolt 3."

In the determination apparatus 1, the strain gauge embedded in each bolt 3 detects strain on the bolt 3 in its axial direction. In the flange fastening work, each bolt 3 is strained in its axial direction due to, for example, the resiliency of the gasket interposed between the pair of annular flanges of the dummy flange 2. That is, the output signal of the strain gauge (i.e., the strain detected by the strain gauge) corresponds to the tightening force of the bolt 3 and nut (i.e., corresponds to the surface pressure between the flange faces fastened together).

Wires extending from the strain gauges of the bolts 3 are connected to the receiver 4. The receiver 4 receives the output signal outputted from each strain gauge when the corresponding bolt 3 is tightened. As one example, the receiver 4 is configured as a known data acquisition interface (DAQ). The receiver 4 performs AD conversion on the output signal received from the strain gauge of each bolt 3, and transmits the resulting signal to the PC 5.

The PC 5 is connected to the receiver 4, and obtains reception signals from the receiver 4 after the reception signals from the strain gauges of the respective bolts 3 have been subjected to the AD conversion. The PC 5 is one example of a general-purpose computer. As shown in FIG. 2, the PC 5 includes: a processor 50 connected to the receiver 4, the display device 6, and the input device 7; and a memory 51 accessible by the processor 50. The processor 50 includes the CPU of the PC 5. As shown in FIG. 2, the processor 50 includes, in terms of its functionality, a measurer 50a, a calculator 50b, and a determiner 50c. For example, the memory 51 is configured by using a hard disk or a nonvolatile memory. The memory 51 stores a predetermined flange fastening skill determination program (hereinafter, referred to as a "determination program") and a plurality of criteria used by the determination program. While the determination apparatus 1 is being driven, the measurer 50a, the calculator 50b, and the determiner 50c of the processor 50 function based on the determination program. The memory 51 further stores the following data in association with one another: ID information of a plurality of testees; measurement results received by the receiver 4 during a determination test for each testee; first, second, and third calculation results calculated based on the determination program by the processor 50 of the determination apparatus 1; and level determination results obtained as a result of determination performed by the processor 50 based on these calculation results.

It should be noted that the PC 5 is provided with the input device 7, which is used by an operator to input information. The input device 7 is connected to the processor 50. As one example, the input device 7 is configured as a keyboard.

The display device 6 is one example of an output device of the determination apparatus 1. The display device 6 outputs (displays) measurement data, calculation results, and determination results obtained by the processor 50. The display device 6 is configured as a liquid crystal display monitor, for example.

[Flow of Determination Test]

Figure 3:
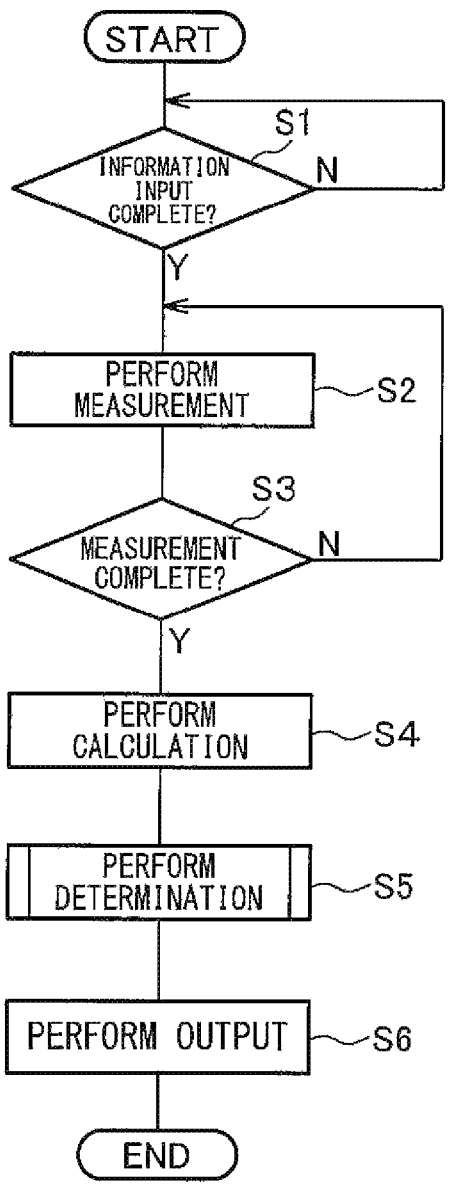
FIG. 3 is a flowchart of overall operations of the flange fastening skill determination apparatus according to a flange fastening skill determination program.

Based on an operation flow shown in FIG. 3, a flange fastening skill determination test (hereinafter, referred to as a "determination test") performed with the determination apparatus 1 by using the determination program is briefly described.

In the determination test, first, the determination apparatus 1 is started, and then the determination program stored in the memory 51 of the processor 50 is loaded into the determination apparatus 1. Further, a tester conducting the test or a person inputting data into the determination apparatus 1 (hereinafter, referred to as an "operator") inputs ID information of a testee into the determination apparatus 1 via the input device 7. As one example, the ID information contains such information as the name of the testee and the date when the determination test is conducted.

After inputting the ID information of the testee, the operator operates the input device 7 to perform the input to notify the determination apparatus 1 of the completion of the input of the ID information. In response, the processor 50 of the determination apparatus 1 judges that the input of the ID information has been completed (S1).

Thereafter, the measurer 50a performs a measuring step based on the determination program to continuously measure the transition of change in the output signals of the strain gauges corresponding to the respective bolts 3 via the receiver 4. The processor 50 stores the resulting measurement data in the memory 51 (S2). Meanwhile, after performing the input to notify the determination apparatus 1 of the completion of the input of the ID information, the operator instructs the testee to start the work of tightening the bolts 3 of the dummy flange 2 by using the spanner S.

Here, in the flange fastening work, the testee does not tighten each bolt to reach a target tightening force $F_{target}$ in a single round of the tightening work, but performs the work of tightening each bolt in stages by dividing the bolt tightening work into m rounds of unit tightening operations (here, m>1). For example, by adopting a bolt tightening sequence of a so-called multiple-round method disclosed in, for example, the organization standard of the American Society of Mechanical Engineers (ASME) or High Pressure Inst. of Japan (HPIS), m rounds of multiple-round work are performed such that, in each round of work, a unit tightening operation is performed on each of n bolts sequentially, and thereby each of the n bolts is tightened to eventually reach the target tightening force $F_{target}$. In this manner, each bolt 3 is subjected to the same number of unit tightening operations, and thereby each bolt 3 is tightened. Accordingly, the tightening force of each bolt 3 changes in stages in accordance with the progress in the unit tightening operations. Therefore, the value of the output signal of the strain gauge of each bolt 3 also changes in stages in accordance with the progress in the unit tightening operations performed on each bolt 3.

When the testee has finished the bolt tightening work for all the bolts 3, the operator performs an input via the input device 7 to notify that the work of tightening all the bolts 3 (eight bolts 3a to 3h) has been completed. In response, the processor 50 ends the measuring step (S3).

It should be noted that, with the determination program, the measurer 50a can be set to measure an elapsed time from the start of the measurement in S2, and after a certain time (e.g., 600 seconds) has elapsed, the measurer 50a can be set to end the measurement automatically (S3).

Subsequently, the calculator 50b performs a calculating step (S4) of obtaining three types of calculation results described below by performing calculation, based on the determination program, on the above measurement results stored in the memory 51.

Specifically, the calculator 50b obtains the following calculation results as skill determining items: a first calculation result indicating variation among the output signal values of the respective strain gauges during the work of tightening the bolts 3; a second calculation result indicating variation among the output signal values of the respective strain gauges at the time of completion of the work of tightening the bolts 3; and a third calculation result indicating the degree of the tightening force of each bolt 3 at the time of completion of the work of tightening the bolts 3.

Hereinafter, for the sake of convenience of the description, the first calculation result is denoted as "α"; the second calculation result is denoted as "β"; and the third calculation result is denoted as "γ". Based on α, it can be evaluated whether or not the bolts 3 are tightened in such a manner as to suppress the occurrence of flange rotation. Based on β, it can be evaluated whether or not all the bolts 3 have been evenly tightened. Based on γ, it can be evaluated whether or not the bolts 3 have been tightened to reach a minimum tightening surface pressure required by the gasket disposed between the pair of annular flanges of the dummy flange 2.

Next, the determiner 50c performs a determining step based on the determination program (S5). Specifically, the determiner 50c uses α, β, and γ obtained in the calculating step as skill determining items to compare each skill determining item with determination criteria prepared in advance, and based on the comparison results, determines to which one of three or more skill levels prepared in advance the skill of the testee in bolt tightening work belongs. As described below in detail, the determination criteria may be, for example, a plurality of graded numerical value ranges.

Next, the processor 50 performs an outputting step of outputting, by the display device 6, the results of the determination performed by the determiner 50c (S6). Then, the determination apparatus 1 ends the determination test. The operator, the testee, and others can check the determination results from the displayed contents on the display device 6.

Hereinafter, in particular, the determining step (S5) and the outputting step (S6) are sequentially described in detail.

[Determining Step]

Since α obtained in the calculating step corresponds to the variation among the output signal values of the respective strain gauges during the work of tightening the bolts 3, α indicates transition of temporal change in the tightening force of each bolt 3. Therefore, by using the three skill determining items, i.e., α in addition to β and γ, the skill of the testee in tightening the bolts 3 can be analyzed in the determining step from various viewpoints by using the various data. Thus, the skill can be properly evaluated by comparing the skill determining items with the determination criteria.

Hereinafter, a specific description of the determining step performed by the determination apparatus 1 is given with reference to the flow of the determining step illustrated in FIG. 4.

Figure 4:
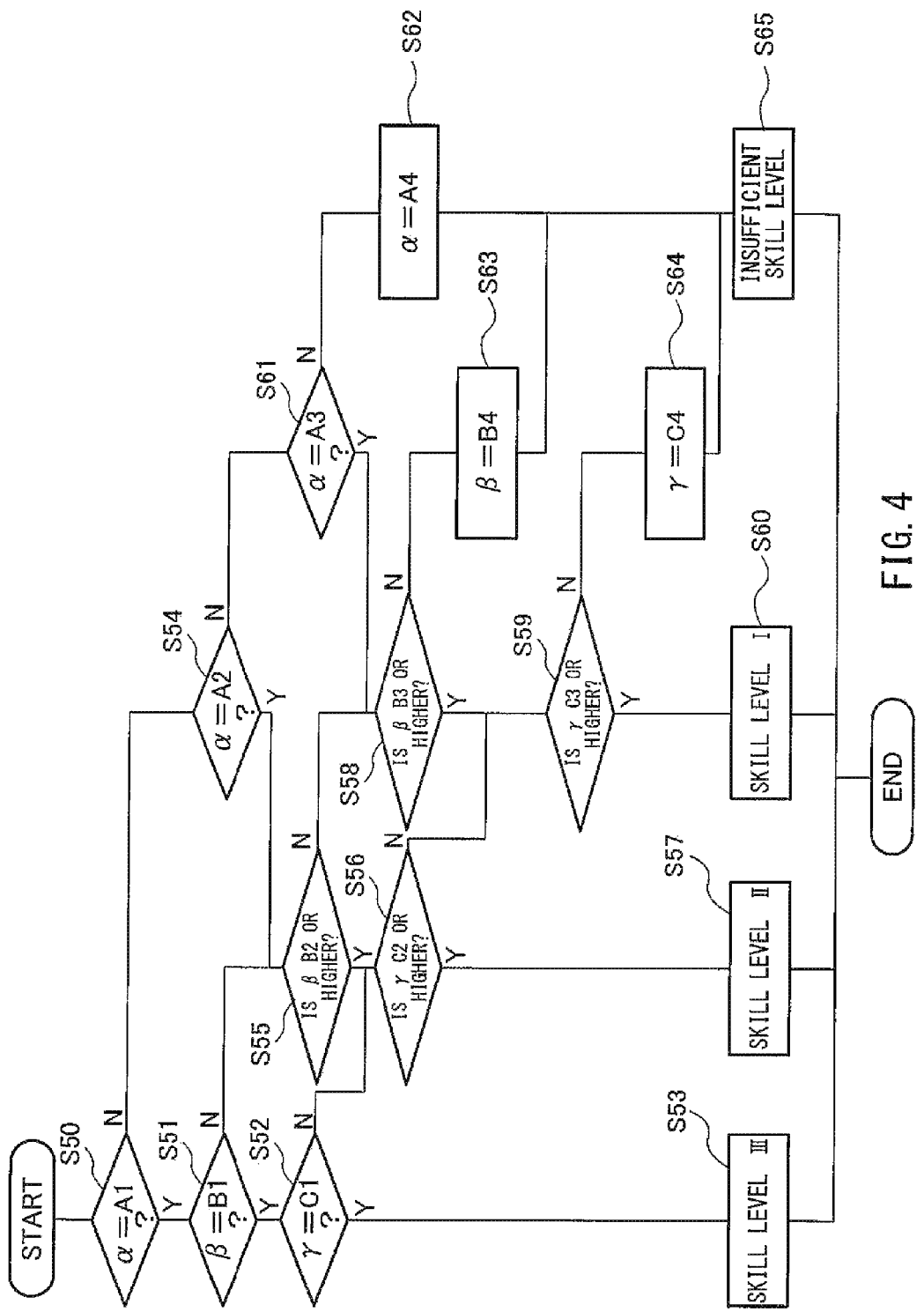
FIG. 4 is a flowchart of a determining step.

In the flow shown in FIG. 4, based on the determination program, the determiner 50c performs determination on the values of α, β, and γ (as one example, the determination is performed on these values in this order) to determine to which one of three or more graded numerical value ranges each of the values belongs. The three or more graded numerical value ranges are prepared in advance corresponding to respective grades in performance. Among α, β, and γ, if any preceding one of the skill determining items has been determined to be insufficient as a result of the comparison, then the determination for the other following skill determining item(s) is not performed, and the flow is ended.

Here, as one specific example, in the calculating step (S4), it is assumed for each bolt 3 that the value of the output signal that is outputted when the bolt 3 is tightened with the target tightening force $F_{target}$ is 100%, and based on the assumption, α [%], β [%], and γ [%] are obtained as calculation results as described below.

The calculation result α [%] indicates variation among the output signal values of the respective strain gauges during the work of tightening the bolts 3; specifically, α [%] indicates the difference between the maximum value and the minimum value among the output signal values of the strain gauges of the respective bolts 3 at the time of completion of any of the unit tightening operations in the work of tightening the bolts 3. Here, as one example, the greatest difference between the maximum value and the minimum value among the output signal values at the time of completion of all the unit tightening operations in the work of tightening the bolts 3 is used.

The calculation result β [%] indicates variation among the output signal values of the respective strain gauges at the time of completion of the work of tightening the bolts 3; specifically, β [%] indicates the difference between the maximum value and the minimum value among the output signal values that are outputted from the respective strain gauges at the time of completion of the work of tightening the bolts 3 (i.e., at the time of completion of the flange fastening work).

The calculation result γ [%] indicates the degree of the tightening force of each of the bolts 3 at the time of completion of the bolt tightening work; specifically, γ [%] indicates the ratio of the tightening force of each of the bolts 3 at the time of completion of the bolt tightening work (i.e., at the time of completion of the flange fastening work) to the target tightening force $F_{target}$.

The value of the target tightening force $F_{target}$ for each bolt 3 can be set as intended. For example, the value of the target tightening force $F_{target}$ for each bolt 3 can be set to its tightening force value that corresponds to the recommended tightening surface pressure of the gasket interposed between the pair of annular flanges of the dummy flange 2. It should be noted that α [%], β [%], and γ [%] can be obtained as calculation results different from those described above. In the description below, as one example, 60% of the $F_{target}$ is set as the recommended tightening surface pressure of the gasket.

The determination apparatus 1 uses four determination criteria for each skill determining item. Specifically, in order to determine the level of α [%], as one example, the following four numerical value ranges are used as the determination criteria: "A1" (13% or less); "A2" (more than 13% but not more than 16%); "A3" (more than 16% but not more than 20%); and "A4" (more than 20%). Also, in order to determine the level of β [%], as one example, the following four numerical value ranges are used as the determination criteria: "B1" (10% or less); "B2" (more than 10% but not more than 15%); "B3" (more than 15% but not more than 20%); and "B4" (more than 20%). Further, in order to determine the level of γ [%], as one example, the following four numerical value ranges are used as the determination criteria: "C1" (not less than 51% and not more than 70%); "C2" (not less than 46% and not more than 75%); "C3" (not less than 36% and not more than 65%); and "C4" (less than 36% or more than 75%). It should be noted that, as one example, the numerical value ranges of "C1" to "C3" for γ overlap one another, and the skill level of the testee can be determined by determining γ in combination with the determination of α and β. As indicated above, in Embodiment 1, the level of α decreases in the order of A1, A2, A3, and A4. Also, the level of β decreases in the order to B1, B2, B3, and B4. Further, the level of γ decreases in the order of C1, C2, C3, and C4.

In the determining step, as one example, the skill level of the testee is determined to be "Skill Level III", which is the highest skill level, only in a case where α [%] is determined to be "A1", β [%] is determined to be "B1", and γ [%] is determined to be "C1". Also in the determining step, as one example, the skill level of the testee is determined to be "Skill Level II" in a case where α [%] is determined to be "A2 or higher", β [%] is determined to be "B2 or higher", γ [%] is determined to be "C2 or higher", but the requirements of "Skill Level III" are not met. Further in the determining step, as one example, the skill level of the testee is determined to be "Skill Level I" in a case where α [%] is determined to be "A3 or higher", β [%] is determined to be "B3 or higher", γ [%] is determined to be "C3 or higher", but the requirements of both "Skill Level III" and "Skill Level II" are not met. Further in the determining step, as one example, the skill level of the testee is determined to be "Insufficient Skill Level" in any of the following cases: a case where α [%] is determined to be "A4"; a case where β [%] is determined to be "B4"; and a case where γ [%] is determined to be "C4".

Hereinafter, specific examples are given with reference to a flowchart. Among the skill determining items, the determiner 50c first determines whether or not α [%] is "A1" (S50). If α [%] is determined to be "A1", the determiner 50c determines whether or not β [%] is "B1" (S51). If β [%] is determined to be "B1", the determiner 50c determines whether or not γ [%] is "C1" (S52). If γ [%] is determined to be "C1", the determiner 50c determines that the skill level of the testee is "Skill Level III", which is the highest skill level (S53). Then, the flow is ended.

On the other hand, as shown in FIG. 4, if the determiner 50c determines α [%] to be "A2" (S54) or determines β [%] to be not "B1" (S51), the determiner 50c determines whether or not β [%] is "B2" or higher (S55). If β [%] is determined to be "B2" or higher, the determiner 50c determines whether or not γ [%] is "C2 or higher" (S56). If γ [%] is determined to be "C2 or higher", the determiner 50c determines that the skill level of the testee is "Skill Level II", which is one level inferior to "Skill Level III" (S57). Then, the flow is ended. Thus, in the example of the flow shown in FIG. 4, the setting is made such that if α [%] is "A2", then "Skill Level III" is not achieved regardless of the determination results regarding β [%] and γ [%].

Alternatively, if the determiner 50c determines α [%] to be "A3" (S61) or determines β [%] to be not "B2 or higher" (S55), the determiner 50c determines whether or not β [%] is "B3 or higher" (S58). If β [%] is determined to be "B3 or higher", the determiner 50c determines whether or not γ [%] is "C3 or higher" (S59). If γ [%] is determined to be "C3 or higher", the determiner 50c determines that the skill level of the testee is "Skill Level I", which is one level inferior to "Skill Level II" (S60). Then, the flow is ended.

It should be noted that if α [%] is determined to be not "A3" in S61, the determiner 50c determines α [%] to be "A4" (S62). If β [%] is determined to be not "B3 or higher" in S58, the determiner 50c determines β [%] to be "B4" (S63). If γ [%] is determined to be not "C3 or higher" in S59, the determiner 50c determines γ [%] to be "C4" (S64). After performing the determination in any one of S62 to S64, the determiner 50c determines that the skill level of the testee is "Insufficient Skill Level" (S65). Then, the flow is ended.

As described above, in the determination apparatus 1, the determiner 50c compares the skill determining items α, β, and γ with the determination criteria, and based on the comparison results, determines to which one of the three or more skill levels (here, "Skill Level III", "Skill Level II", "Skill Level I", and "Insufficient Skill Level") the skill of the testee in the work of tightening the bolts 3 corresponds. The "Skill Level III" herein means, for example, that a worker with the Skill Level III can perform alone the work of tightening the bolts of pipes in which a spiral wound gasket is used in all of the lines in a factory. The "Skill Level II" means, for example, that a worker with the Skill Level II can perform alone the work of tightening the bolts of flanges in which a joint sheet gasket is used although the worker cannot perform alone the work of tightening the bolts of flanges in which a spiral wound gasket is used. The "Skill Level I" means, for example, that a worker with the Skill Level I can perform the work of tightening the bolts of flanges only when the worker works in cooperation with another worker having a skill level of "Skill Level II" or higher, but cannot perform the work of tightening the bolts of flanges in which a spiral wound gasket is used even when pairing up with a worker having a skill level of "Skill Level II". The "Insufficient Skill Level" means, for example, that a worker with the Insufficient Skill Level cannot perform any bolt tightening work and is merely capable of performing, for example, maintenance of flange faces, bolts, and nuts. At a work site, for example, a sticker indicating a skill level may be affixed to a visible position on each worker's helmet beforehand, which allows each worker's skill level to be readily recognized.

As described above, the determination apparatus 1 does not merely monitor or measure the tightened state of the bolts after fastening the flanges, but enables the evaluation of the flange fastening work itself, which has been difficult with conventional art. In particular, the determination apparatus 1 can evaluate the degree of variation among the tightening forces of the respective bolts 3 at one point in time during the bolt tightening work by performing the determining step using α as a skill determining item. This makes it possible to determine whether or not there is a risk of causing the problem of, for example, flange rotation, which could occur when a bolt is tightened rapidly.

Further, by performing the determining step using β as a skill determining item, the determination apparatus 1 can determine whether or not there is a risk of causing the problem of, for example, uneven tightening, which could occur in a case where there is a certain degree or more of variation among the tightening forces of the respective bolts 3 at the time of completion of the bolt tightening work (i.e., at the time of completion of the flange fastening work).

Still further, by performing the determining step using γ as a skill determining item, the determination apparatus 1 can determine whether or not there is a risk of causing the problem of, for example, leakage from the pipes, which could occur when the tightening forces of the bolts are insufficient.

Consequently, according to the determination apparatus 1 and the determination program, the skill of a testee in flange fastening work can be objectively and clearly evaluated regardless of experiences and intuition of the testee in bolt tightening work. This makes it possible to properly choose the most suitable worker for the flange fastening work.

It should be noted that the above-described numerical value ranges (A1 to A4, B1 to B4, and C1 to C4) of the determination criteria for the respective determining items α, β, and γ are, of course, merely examples. At least part of the numerical value ranges can be changed as necessary.

[Outputting Step]

Figure 5:
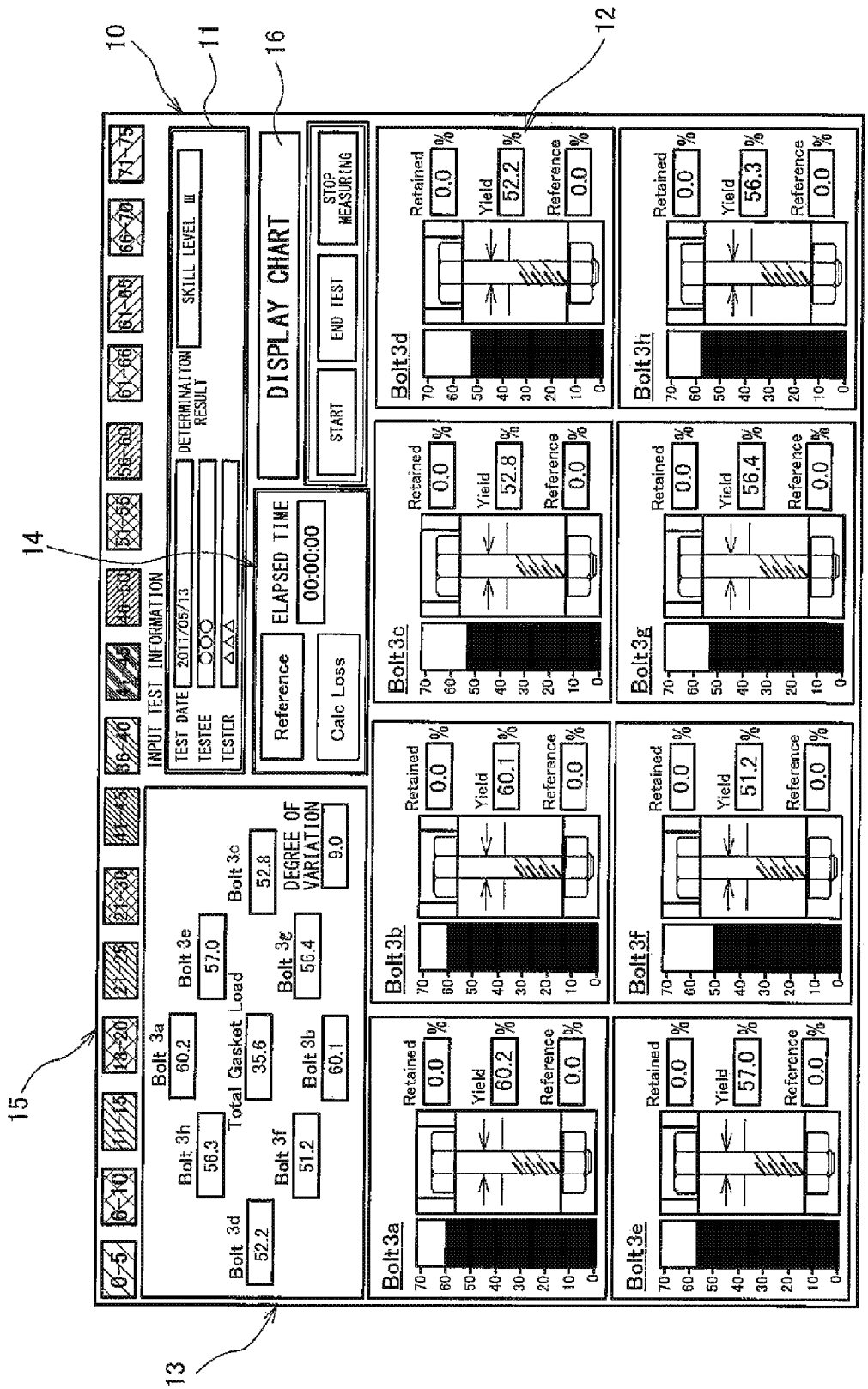
FIG. 5 shows displayed contents (a determination screen) on a display device in an outputting step.

As shown in FIG. 5, the processor 50 causes the display device 6 to display a determination screen 10 in the outputting step. The determination screen 10 includes a first display region 11, a second display region 12, a third display region 13, a fourth display region 14, and a fifth display region 15.

The first display region 11 displays a test date, the name of a testee, the name of a tester, and determination results.

The second display region 12 graphically displays measurement results of the tightening forces of the eight respective bolts 3 (bolts 3a to 3h) at certain points in time during bolt tightening work.

The third display region 13 displays the ratio [%] of the tightening force of each bolt to the target tightening force $F_{target}$ assuming the target tightening force $F_{target}$ is 100%. The ratio is displayed in one of a plurality of different background colors. The different background colors correspond to predetermined respective numerical value ranges. (In one example, the background color changes every 5%). The third display region 13 also displays the degree of variation among the tightening forces [%] of the respective bolts 3 (bolts 3a to 3h) (i.e., the degree of variation among the ratios of the respective tightening forces to the target tightening force $F_{target}$). After the work of tightening all the bolts 3 has been completed, the value of the degree of variation, which is displayed in the third display region 13, is displayed as the value of β [%].

The fourth display region 14 displays an elapsed time in the determination test. The fifth display region 15 displays colors corresponding to the background colors displayed in the third display region 13 so that a person looking at the screen can check to which one of the numerical value ranges of the ratio [%] of the bolt tightening force to the target tightening force $F_{target}$ each of the background colors displayed in the third display region 13 corresponds.

In the outputting step, the processor 50 causes the display device 6 to display the determination screen 10, and also causes the first display region 11 of the determination screen 10 to display the result of the determination performed by the processor 50 in any one of the steps S53, S57, S60, and S65 in the flow of FIG. 4. A person looking at the screen will learn the result of the determination test of the testee from the displayed contents in the first display region 11.

Figure 6:
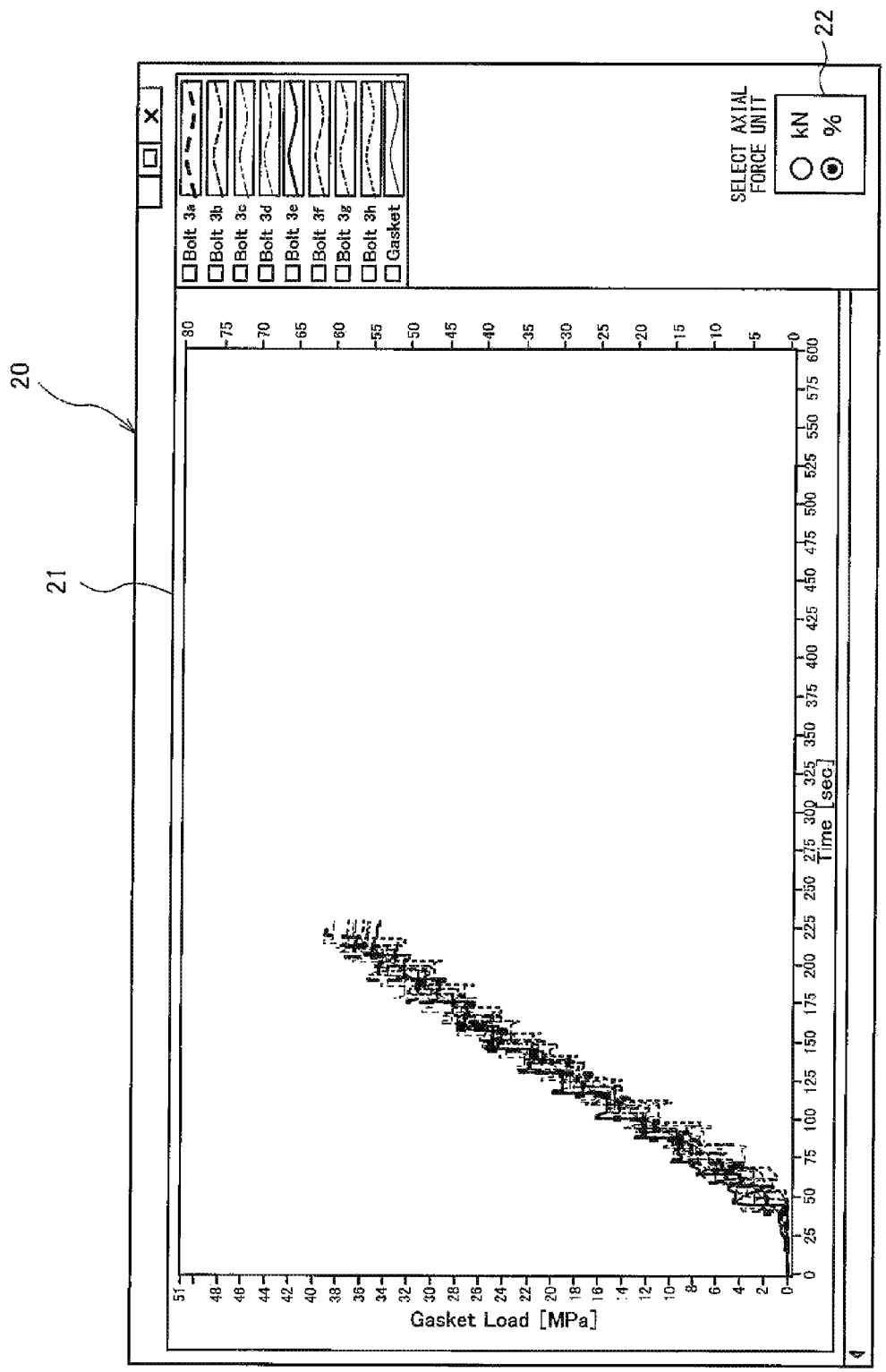
FIG. 6 shows displayed contents (a determination chart screen) on the display device in the outputting step.

When the operator selects a chart display button 16 on the determination screen 10, a determination chart screen 20 is displayed over the determination screen 10 as shown in FIG. 6. A sixth display region 21 is displayed at the center of the determination chart screen 20. As one example, the sixth display region 21 displays a chart of a two-dimensional coordinate system. In the chart, the horizontal axis indicates the elapsed time [sec] in the bolt tightening work in the determination test; the left vertical axis indicates the gasket load [MPa]; and the right vertical axis indicates the ratio [%] of the tightening force of each bolt 3 to the target tightening force $F_{target}$ in a case where the $F_{target}$ is 100%. By operating a selection button 22, the measurement value [MPa] of the tightening force of each bolt 3 can be alternatively indicated on the right vertical axis of the sixth display region 21. In the sixth display region 21, the data of the bolts 3 are displayed in the form of a continuous curve in accordance with the elapsed time, and are displayed in different manners from one another, specifically, in different colors from one another. Therefore, in the sixth display region 21, the values of the skill determining items (α, β, and γ) in the calculating step S5, the values being obtained from the work of tightening the bolts 3, can be readily checked.

Specifically, in the sixth display region 21, α [%] can be derived by comparing the variations of the tightening forces of the respective bolts 3 at one point in time during the bolt tightening work with one another by using a scale on the right vertical axis. Accordingly, regarding the determination test result, the operator, the testee, and others can determine, for example, to which one of the numerical value ranges A1 to A4 the value of α [%] at the one point in time during the bolt tightening work corresponds. For example, if α [%] corresponds to A4 and the value thereof exceeds 25%, then the operator can determine that, in a case where a spiral wound gasket is used, there is a risk that the outer periphery of the hoop becomes crushed, which will cause a decrease in the sealed area and result in degradation in the sealing performance of the gasket. As thus described, when the determination screen 10 is displayed, the operator can check α [%] by looking at the degree of variation [%] indicated in the third display region 13.

It should be noted that the operator can examine, in real time, the unit tightening operations performed by the testee by displaying the determination chart screen 20 during the bolt tightening work being performed in the determination test. For example, when a unit tightening operation of tightening any one of the bolts 3 has been performed in the first round of the multiple-round flange fastening work, if the operator recognizes that a change amount ΔF in the tightening force has exceeded 25% of the target tightening force $F_{target}$, then the operator can immediately end the determination test.

In the sixth display region 21, the ratio of the tightening force of each of the bolts 3 at the time of completion of the bolt tightening work is displayed as γ [%]. Accordingly, regarding the determination test result, the operator, the testee, and others can determine to which one of the numerical value ranges C1 to C4 the value of γ [%] belongs. If, for example, it is clear that γ [%] has not reached the target tightening force $F_{target}$ when looking at the sixth display region 21 and the value of (Reference) [%] in the second display region 12, then the person looking at the screen can recognize that there is a risk of leakage due to the insufficiency in the tightening force.

On the determination chart screen 20, the curve of only one of the bolts can be displayed by selecting one of selection buttons 23 positioned on the upper right of the screen, the selection buttons 23 corresponding to the bolts 3a to 3h, respectively. The sixth display region 21 can be checked in real time even during the measuring step (S2) in the determination test by operating the determination apparatus 1.

As described above, in the outputting step (S6), α, β, and γ obtained in the calculating step by the calculator 50b are displayed by the display device 6 in such a manner as to allow a person to visually check α, β, and γ. Accordingly, for example, not only can the operator, the testee, and others determine whether or not the skill of the testee in the flange fastening work satisfy the determination criteria, but they can also objectively and clearly evaluate to which one of the three or more skill levels prepared in advance the skill level of the testee in the flange fastening work corresponds, by merely looking at the contents displayed on the display device 6. Moreover, since the data of the determination test of the testee are stored in the memory 51 in association with the ID information of the testee, the ID information of the testee and past determination test results of the testee can be checked together at any time.

Consequently, Embodiment 1 makes it possible to provide a flange fastening skill determination apparatus and a flange fastening skill determination program that are capable of objectively and clearly determining the skill of a worker in flange fastening. Accordingly, for example, workers suitable for flange fastening work can be properly chosen, and thereby a group of workers from which the quality of work meeting or exceeding certain standards can be expected can be readily formed. This makes it possible to reduce bolt tightening work failure and improve the quality of the bolt tightening work.

Moreover, each testee can objectively and clearly recognize their skill level. This helps to improve their skill level in a short time. Furthermore, increase in their professional awareness necessary when engaged in flange fastening work can be expected.

Hereinafter, other embodiments of the present invention are described focusing on differences from Embodiment 1.

Embodiment 2

Figure 7:
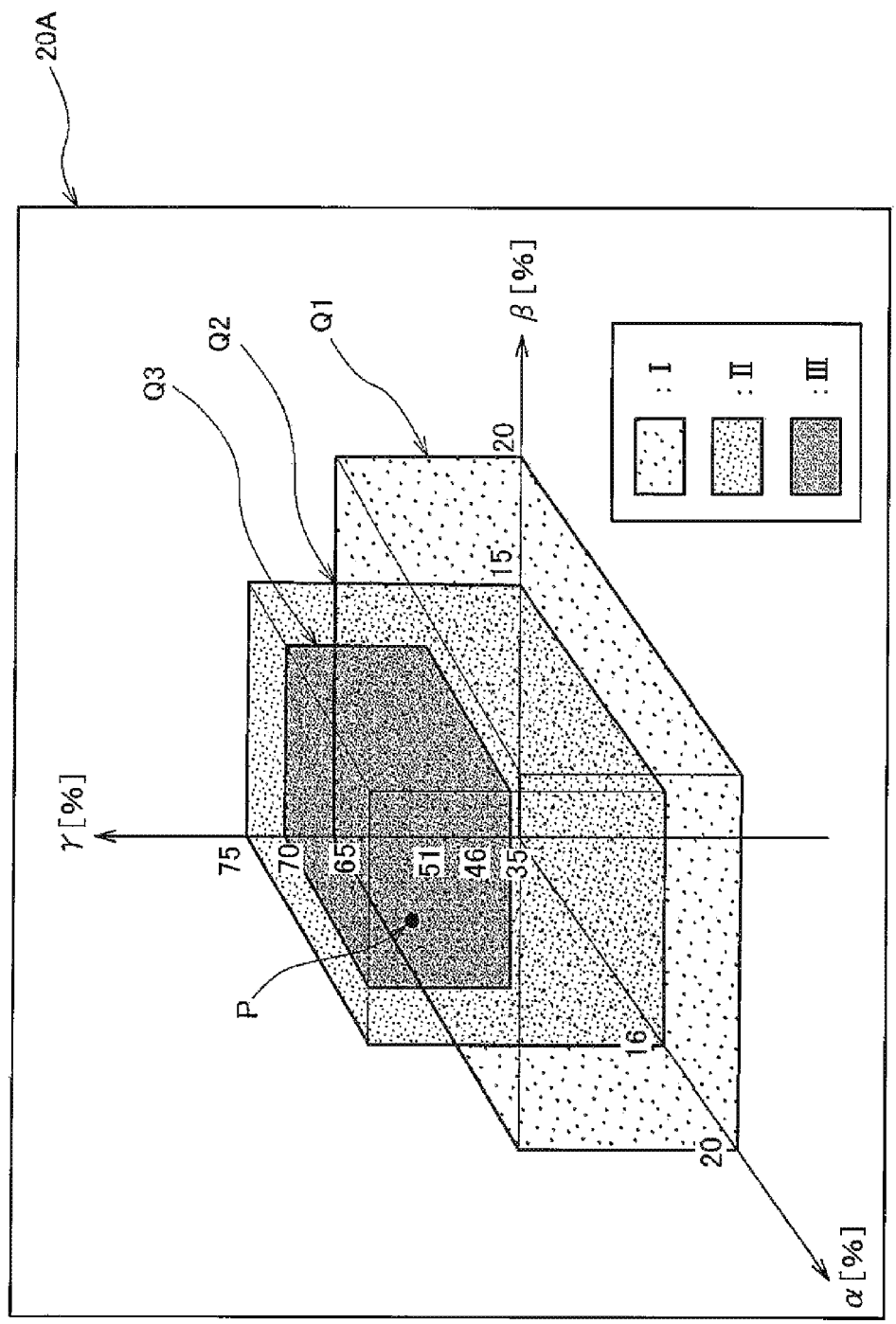
FIG. 7 shows displayed contents on the display device according to Embodiment 2.

FIG. 7 shows a determination chart screen 20A displayed by the display device 6 of a determination apparatus according to Embodiment 2.

On the determination chart screen 20A, $\alpha$, $\beta$, and $\gamma$ are displayed by using a spatial coordinate system, such that $\alpha$, $\beta$, and $\gamma$ correspond to X-axis, Y-axis, and Z-axis spatial coordinates, respectively. Accordingly, skill level numerical value ranges corresponding to "Skill Level III", "Skill Level II", and "Skill Level I" are shown as cubic spaces Q3, Q2, and Q1, respectively. It should be noted that a skill level numerical value range corresponding to "Insufficient Skill Level" is shown as a space that does not overlap any of the spaces Q1 to Q3. The position of a point P in the spatial coordinate system represents the values of $\alpha$, $\beta$, and $\gamma$ of the testee obtained in the determination test.

Also with the above-described type of display, $\alpha$, $\beta$, and $\gamma$ obtained by the calculation in the calculating step by the calculator 50b can be displayed in such a manner as to allow the operator, the testee, and others to visually check a$\alpha\beta$, and $\gamma$. Moreover, the skill determining items $\alpha$, $\beta$, and $\gamma$ are displayed corresponding to the X-axis, Y-axis, and Z-axis, respectively. Therefore, for example, the reason for the result of the determination performed by the determiner 50c for the testee in the determining step can be readily checked for each skill determining item by using the determination chart screen 20A. It should be noted that the spaces Q1 to Q3 may be displayed in such a manner that Q1 to Q3 are distinguishable from one another (e.g., displayed in different colors from one another) so that the spaces Q3, Q2, and Q1 representing "Skill Level III", "Skill Level II", and "Skill Level I", respectively, can be readily distinguished from one another.

Embodiment 3

Figure 8:
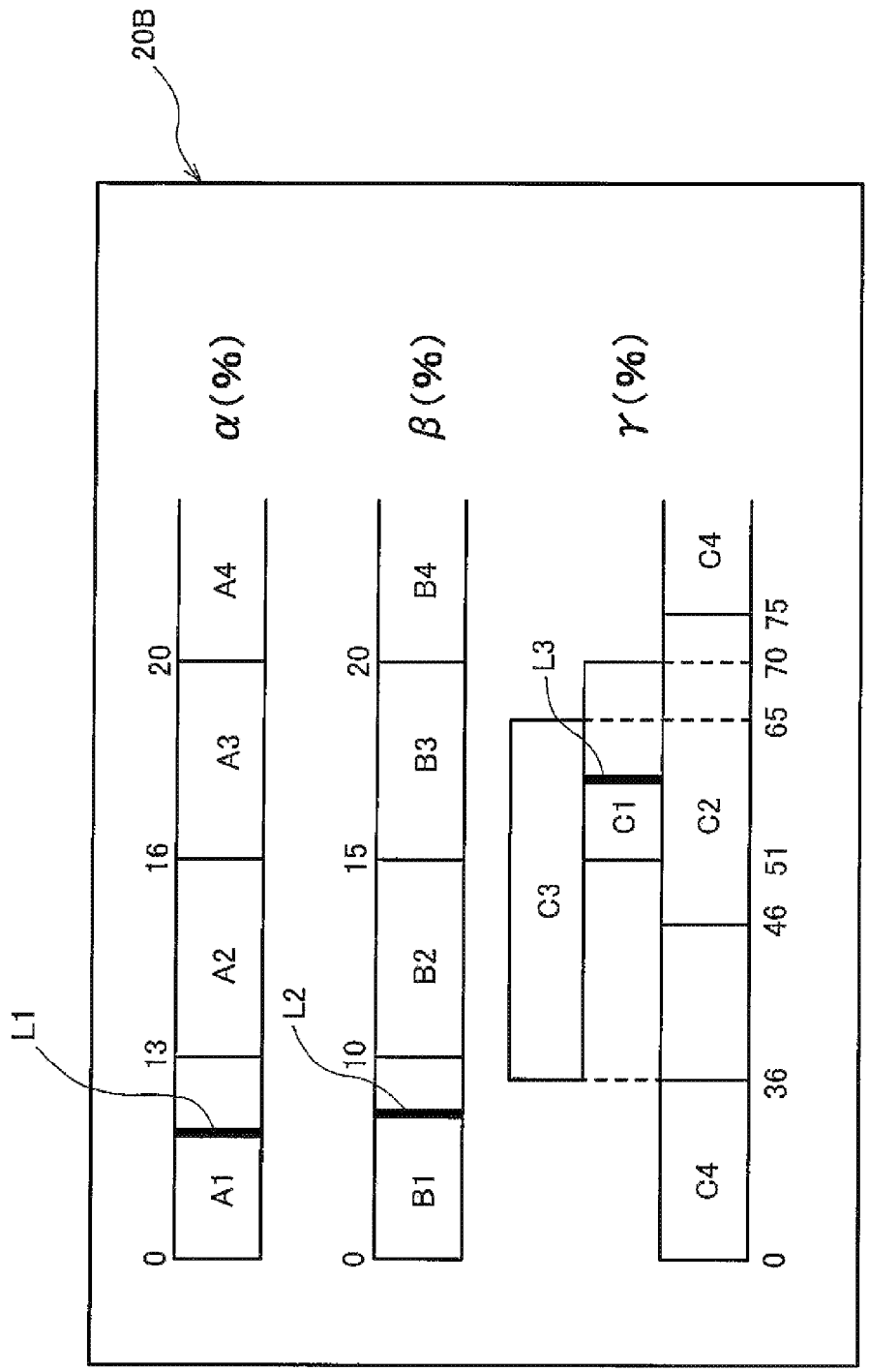
FIG. 8 shows displayed contents on the display device according to Embodiment 3.

FIG. 8 shows a determination chart screen 20B displayed on the display device 6 of a determination apparatus according to Embodiment 3.

On the determination chart screen 20B, by using a chart of a two-dimensional coordinate system, the skill determining items are individually displayed in parallel to one another in the vertical direction. In this manner, numerical value ranges (A1 to A4, B1 to B4, C1 to C4) of the determination criteria for making determinations of "Skill Level III", "Skill Level II", "Skill Level I", and "Insufficient Skill Level" for the skill determining items are displayed together with the skill determining items, and the values of $\alpha$, $\beta$, and $\gamma$ of the testee obtained in the determination test can be indicated (in FIG. 8, indicated as bold lines L1 to L3) at respective positions in the corresponding numerical value ranges of the determination criteria.

Also with the above-described type of display, $\alpha$, $\beta$, and $\gamma$ obtained by the calculation in the calculating step by the calculator 50b can be displayed in such a manner as to allow the operator, the testee, and others to visually check $\alpha$, $\beta$, and $\gamma$. With this type of display, the values of $\alpha$, $\beta$, and $\gamma$ can be individually and readily checked through the comparison of the values of $\alpha$, $\beta$, and $\gamma$ with the numerical value ranges of the determination criteria, and also, the levels of $\alpha$, $\beta$, and $\gamma$ of the testee can be examined in detail by comparing these levels with corresponding criterial ranges, and thereby the specific level of each skill determining item in its corresponding criterial range can be known.

<Other Matters>

In Embodiment 1, the determiner 50c performs the determination on the skill determining items in the order of $\alpha$, $\beta$, and $\gamma$. However, the present invention is not thus limited. The determiner 50c may perform the determination on $\alpha$, $\beta$, and $\gamma$ in any order.

In Embodiment 1, the receiver 4 of the determination apparatus 1 is separated from the PC 5. However, the present invention is not limited to such a configuration. For example, the receiver 4 may be disposed inside the PC 5, and may be configured as an internal component of the PC 5. Also, the memory 51 need not be disposed inside the PC 5. For example, the memory may be disposed on an external network connected to the PC 5.

The output device of the determination apparatus is not limited to the display device 6 serving as the display of the PC 5. For example, the output device may be configured to output the results of the determination performed in the determining step by the determiner 50c to any of the followings: a piece of paper; a sheet; and a storage medium of any kind.

Bolt tightening work in which the skill of a worker can be determined with the present invention is of course not limited to the work of tightening bolts for connecting flanges of pipes in a production factory or the like. With the present invention, the skill of a worker can be properly determined, for example, in the work of tightening bolts for sealing, connecting, or assembling various structures, for example, a pressure vessel such as a decompression chamber and a rotating device such as a motor shaft.

The strain gauges used in the present invention are individually provided corresponding to a plurality of respective bolts used in the fastening work. Therefore, for example, the strain gauges may be individually provided on the gasket disposed between the pair of flanges of the dummy flange, such that the strain gauges are provided at positions that correspond to the respective bolts.

In the above-described embodiments, the strain gauges are used as one example of tightening force detectors. However, the tightening force detectors are not limited to strain gauges, but may be different devices, such as piezoelectric elements. In this case, between the pair of flanges, the piezoelectric elements are arranged at positions corresponding to the respective bolts so that the same detection as that performed in the case of using the strain gauges can be performed.

In the case of using strain gauges as tightening force detectors, the strain gauges are not limited to temperature-compensated three-wire strain gauges, but may be a different type of strain gauges.

In the above-described embodiments, the skill of a worker in flange fastening is determined by using all the three skill determining items $\alpha$, $\beta$, and $\gamma$. However, in some cases, the flange fastening skill can be determined by using only selected two of the skill determining items. Even in such a case, the flange fastening skill can be determined from various viewpoints based on the two skill determining items.

INDUSTRIAL APPLICABILITY

As described above, one aspect of the present invention has an excellent advantageous effect of being able to provide a flange fastening skill determination apparatus and a flange fastening skill determination program that are capable of objectively and clearly determining the skill of a worker in flange fastening. Therefore, the present invention is useful when widely applied as a flange fastening skill determination apparatus and a flange fastening skill determination program that make it possible to exert the above advantageous effect meaningfully.

REFERENCE SIGNS LIST 1 flange fastening skill determination apparatus
2 dummy flange
3, 3a to 3h tightening-force-detector-equipped bolt
4 receiver
5 personal computer (PC)
6 output device
7 input device
50 processor
50a measurer
50b calculator
50c determiner
51 memory

The invention claimed is:

1. A flange fastening skill determination apparatus comprising:
a pair of flanges;
a plurality of bolts connecting the a pair of flanges together;
tightening force detectors individually provided corresponding to the plurality of respective bolts and configured to generate output signals when a testee performs work of tightening the plurality of bolts that are tightened to connect the flanges together;
a receiver operatively coupled to the tightening force detectors and configured to receive output signals that are outputted from the respective tightening force detectors;
a processor operatively coupled to the receiver and configured to:
obtain a plurality of measurement results, the measurement results indicating transition of change in each of the output signals received by the receiver from a start to an end of the work of tightening a corresponding one of the plurality of bolts;
obtain a first calculation result, a second calculation result, and a third calculation result, each as a skill determining item, by performing calculation on the plurality of measurement results, the first calculation result indicating variation among output signal values of the respective tightening force detectors during the work of tightening the plurality of bolts, the second calculation result indicating variation among output signal values of the respective tightening force detectors at a time of completion of the work of tightening the plurality of bolts, the third calculation result indicating a degree of tightening force of each of the plurality of bolts at the time of completion of the work of tightening the plurality of bolts;
determine, based on results of comparing the skill determining items with determination criteria, to which one of three or more skill levels a skill of the testee in the work of tightening the bolts corresponds; and
a display device configured to output a result of the determination performed by the processor.

2. The flange fastening skill determination apparatus according to claim 1, wherein
the work of tightening each of the plurality of bolts includes a plurality of unit tightening operations, and
the processor obtains, as the first calculation result, a difference between a maximum value and a minimum value among the output signal values of the respective tightening force detectors at a time of completion of any of the unit tightening operations in the work of tightening the plurality of bolts.

3. The flange fastening skill determination apparatus according to claim 2, wherein
the processor obtains, as the first calculation result, a greatest difference between the maximum value and the minimum value among the output signal values at a time of completion of all the unit tightening operations in the work of tightening the plurality of bolts.

4. The flange fastening skill determination apparatus according to claim 1, wherein
the processor obtains, as the second calculation result, a difference between a maximum value and a minimum value among the output signal values that are outputted at the time of completion of the work of tightening the plurality of bolts.

5. The flange fastening skill determination apparatus according to claim 1, wherein
the display device is configured to display the result of the determination performed by the processor, and
the display device displays the result of the determination performed by the processor, such that the result of the determination is displayed differently for each skill level in a distinguishable manner.

6. The flange fastening skill determination apparatus according to claim 1, wherein
the display device is configured to display the third calculation result, and
the display device displays the third calculation result in different colors that correspond to predetermined respective numerical value ranges.

7. The flange fastening skill determination apparatus according to claim 1, further comprising a memory configured to store the measurement results, the first, second, and third calculation results, and the result of the determination.

8. The flange fastening skill determination apparatus according to claim 7, wherein
the memory further stores ID information of the testee in association with the measurement results, the first, second, and third calculation results, and the result of the determination.

9. A computer-implemented flange fastening skill determination method for causing the computer to perform:
a calculating step of
receiving, via a receiver operatively coupled to tightening detectors, output signals that are outputted from respective tightening force detectors when a testee performs work of tightening a plurality of bolts that are tightened for connecting flanges together, the tightening force detectors being individually provided corresponding to the plurality of respective bolts, obtaining, via a processor of the computer, a plurality of measurement results, the measurement results indicating transition of change in each of the received output signals from a start to an end of the work of tightening a corresponding one of the plurality of bolts, and obtaining, via the processor, a first calculation result, a second calculation result, and a third calculation result, each as a skill determining item, by performing calculation on the plurality of measurement results, the first calculation result indicating variation among output signal values of the respective tightening force detectors during the work of tightening the plurality of bolts, the second calculation result indicating variation among output signal values of the respective tightening force detectors at a time of completion of the work of tightening the plurality of bolts, the third calculation result indicating a degree of tightening force of each of the plurality of bolts at the time of completion of the work of tightening the plurality of bolts;

a determining step of determining, via the processor, based on results of comparing the skill determining items with determination criteria, to which one of three or more skill levels a skill of the testee in the work of tightening the bolts corresponds; and an outputting step of outputting, via a display device, a result of the determination performed in the determining step.

* * * * *